US012140279B1

(12) United States Patent
Doble

(10) Patent No.: US 12,140,279 B1
(45) Date of Patent: Nov. 12, 2024

(54) KEROSENE LANTERN CONVERSION KITS

(71) Applicant: Barefoot Citizens IP Pty Ltd, Bulimba (AU)

(72) Inventor: Simon James Doble, Teneriffe (AU)

(73) Assignee: Barefoot Citizens IP Pty Ltd, Bulimba (AU)

( * ) Notice: Subject to any disclaimer, the term of this patent is extended or adjusted under 35 U.S.C. 154(b) by 0 days.

(21) Appl. No.: 18/479,389

(22) Filed: Oct. 2, 2023

(51) Int. Cl.
*F21L 27/00* (2006.01)
*F21L 4/08* (2006.01)

(52) U.S. Cl.
CPC ................. *F21L 27/00* (2013.01); *F21L 4/08* (2013.01)

(58) Field of Classification Search
CPC .................................... F21L 4/08; F21L 27/00
See application file for complete search history.

(56) References Cited

U.S. PATENT DOCUMENTS 2,469,491 A * 5/1949 Bailey ..................... F21L 27/00 362/314
5,237,490 A * 8/1993 Ferng ........................ F21V 5/04 362/240
6,280,053 B1 * 8/2001 Chien ..................... F21S 8/035 362/228
9,452,876 B2 * 9/2016 Anelevitz ............ B65D 81/383
10,832,395 B2 * 11/2020 Drescher ................ H04N 23/90
2007/0274066 A1 * 11/2007 Lodhie ...................... H02J 7/35 362/183
2016/0133814 A1 * 5/2016 Ghoshal ................. H10N 10/17 136/205
2019/0338900 A1 * 11/2019 Benninghoff ........... F21L 27/00

* cited by examiner

*Primary Examiner* — Arman B Fallahkhair
(74) *Attorney, Agent, or Firm* — Morrison & Foerster LLP

(57) ABSTRACT

Disclosed herein are kerosene lantern conversion kits for converting kerosene lanterns to solar light devices. The kerosene lantern conversion kit may comprise a light unit configured to be inserted to the kerosene lantern, the light unit including a light source and a battery electrically coupled to the light source. The kerosene lantern conversion kit may comprise a switch unit configured to be inserted into a kerosene-filling opening of the kerosene lantern, the switch unit including a switch configured to electrically couple to the light source to control the light source. The kerosene lantern conversion kit may comprise a solar panel that can electrically couple to the battery to deliver energy generated by the solar panel to the battery. Using the conversion kits described herein, kerosene lanterns can easily be retrofitted to solar light devices using few tools and with limited basic training.

20 Claims, 9 Drawing Sheets

KEROSENE LANTERN CONVERSION KITS

FIELD

This disclosure relates generally to solar light kits, and more specifically to solar light kits for converting kerosene lanterns to solar light devices.

BACKGROUND

In developing nations, many communities live without steady access to electricity. As a result, when the sun goes down, families turn to kerosene gas lanterns to light their homes. Kerosene gas lanterns are an expensive and dangerous source of lighting. These lanterns emit dangerous air pollutants such as black carbon, carbon monoxide, and carbon dioxide, all of which are known to be harmful to people and to the environment. Inhaling black carbon or carbon monoxide causes cardiovascular diseases, respiratory illnesses, and can even lead to death. Black carbon is also a leading contributor to climate change. When kerosene is burned in gas lanterns, the emitted black carbon can remain in the atmosphere for weeks, and long term, can cause lake acidification, acid rain, and can deplete nutrients in the soil, thereby affecting vegetation.

Kerosene lanterns are also a safety hazard. Accidental ingestion of kerosene by children is the leading cause of child poisoning in Africa. Kerosene is typically stored in empty containers and bottles in the home, which makes it easy for children to mistake the kerosene for something else. Ingesting kerosene can cause pneumonia, respiratory illness, and food poisoning. Kerosene is also a common cause of many building fires and human burn accidents. The lanterns are typically used in confined spaces where they can easily be knocked over, which starts a fire. Also, parts of the lantern can heat to a temperature that causes burns if accidentally touched.

Despite these negative environmental and health impacts and risks, people continue to use kerosene because few viable alternatives exist, and kerosene is relatively cheap. Moreover, in instances where alternatives are presented, it can be challenging to convince kerosene lantern users to forfeit the gas lantern they are accustomed to for an unfamiliar alternative. Thus, there remains a need for an alternative lighting source to kerosene gas lanterns that not only negates the negative health and environmental effects associated with kerosene gas lanterns, but also is easily integral to households to create safe, lasting lighting practices.

SUMMARY

Described herein are kits for converting kerosene gas lanterns into solar light sources. The kit may be used to retrofit an existing kerosene gas lantern with an electronic solar energy-powered light device to convert the lantern into a solar light source. The kit can include a light unit that replaces the existing internal components of the kerosene lantern (e.g., the wick and its related components). The light unit can include a light source and a rechargeable battery electrically coupled to the light source. The light unit may be electrically coupled to a switch unit that can be inserted to the existing kerosene-filling opening in the lantern, the switch unit including a switch for turning the light source on and off. The kerosene lantern conversion kit can also include a solar panel configured to electrically couple to the light unit to deliver energy generated by the solar panel to the light source.

The kerosene lantern conversion kit provided herein may be used to convert kerosene lanterns with few tools and limited training. The kit may only necessitate a can/tin opener to remove the base of the lantern and insert the appropriate lighting components of the solar light device described herein. Moreover, converting the kerosene lanterns to solar light devices as described herein may be a simple process with only a few steps, and thus may require little-to-no training. Thus, the kerosene lantern conversion kits may be easily integrated into developing and remote communities that otherwise do not have access to advanced tools and/or training resources. In turn, the community is provided long-lasting, efficient, and eco-friendly solar light sources in place of dangerous kerosene-burning lanterns, and the harmful environmental and health risks of kerosene lanterns are minimized.

In some examples, a kit for converting a kerosene lantern to a solar light device is provided, comprising: a light unit configured to be inserted into the kerosene lantern, comprising: a light source; and a battery electrically coupled to the light source; a switch unit configured to be inserted into a kerosene-filling opening of the kerosene lantern, comprising: a switch configured to electrically couple to the light source to control the light source; and a solar panel configured to electrically couple to the battery to deliver energy generated by the solar panel to the battery. In some examples, the switch unit comprises an electrical port configured to facilitate connection between the battery and the solar panel to deliver the energy generated by the solar panel to the battery. In some examples, the kit comprises a cable configured to connect to the electrical port and to the solar panel to deliver the energy generated by the solar panel to the battery. In some examples, the light unit comprises a light housing configured to enclose the light source and the battery. In some examples, the light unit comprises a collar configured to removably attach the light housing to a wick holder within the kerosene lantern. In some examples, the collar and the light housing are configured to removably attach via a threaded mechanism, snap-fit, or press-fit. In some examples, the light housing comprises a first attachment body configured to removably attach to a second attachment body of the light housing to enclose the light source and the battery. In some examples, the first attachment body is configured to removably attach to the second attachment body without using additional attachment components. In some examples, the light unit comprises a circuit board, and the light source is mounted to the circuit board and the battery is electrically coupled to the circuit board. In some examples, the solar panel is configured to attach to an external surface of the kerosene lantern. In some examples, the light unit is configured to be inserted to a base of the kerosene lantern such that a light-emitting portion of the light unit extends through a wick holder of the kerosene lantern and into a light-emitting portion of the kerosene lantern. In some examples, the switch unit comprises a button molding configured to cover the kerosene-filling opening and comprising a button configured to couple to the switch to control the light source. In some examples, the switch unit comprises a switch housing configured to enclose the switch and the electrical port, the switch housing comprising one or more openings for accessing the switch and the electrical port. In some examples, the switch unit comprises a collar configured to secure the switch housing within the kerosene-filling opening. In some examples, the collar and the switch housing are configured to removably attach via a threaded mechanism, snap-fit, or press-fit.

In some examples, a method for converting a kerosene lantern to a solar light device is provided, comprising: removing a bottom face of the kerosene lantern; inserting a light unit into the kerosene lantern, the light unit comprising a light source and a battery electrically coupled to the light source, the battery configured to receive energy generated by a solar panel; inserting a switch unit into a kerosene-filling opening of the kerosene lantern, the switch unit comprising a switch configured to control the light source; and electrically connecting the switch and the light source. In some examples, the methods comprises removing a wick mechanism from within the kerosene lantern by hand. In some examples, the methods comprises attaching the light unit to a wick holder within the kerosene lantern using a first collar. In some examples, the methods comprises securing the switch unit within the kerosene-filling opening using a second collar. In some examples, a can opener is used to remove the bottom face of the kerosene lantern.

BRIEF DESCRIPTION OF FIGURES

Various aspects of the disclosed systems and methods are set forth with particularity in the appended claims. A better understanding of the features and advantages of the disclosed systems and methods will be obtained by reference to the detailed description of illustrative embodiments and the accompanying drawings.

DETAILED DESCRIPTION

Provided herein are kits for converting kerosene lanterns to solar light devices. The kerosene lantern conversion kits described herein can include a light unit that replaces the existing wick components within the lantern and includes a light source coupled to a battery. The kit can also include a switch unit configured to be inserted to the kerosene-filling opening in the base of the lanterns and configured to control the light source. The kerosene lantern conversion kit can further include a solar panel that can electrically couple to the light unit to provide solar energy to the battery and power the solar light device. Retrofitting kerosene lanterns into solar light devices as provided herein may be a simple process that requires few machining skills and limited tools. For example, the conversion process may only require one tool—a tin or can opener to remove the base of the kerosene lantern. Moreover, converting the kerosene lanterns to solar light devices may require minimal training. For these reasons, the kerosene lantern conversion kits described herein can be easily integrated into communities using kerosene lanterns, thereby diminishing the use of kerosene lanterns in these communities, and overall improving health and environmental outcomes.

The following disclosure will first describe the kerosene lantern conversion kits, including components of the light unit and switch unit of the conversion kit, followed by an example method of converting a kerosene lantern to a solar light device.

Kerosene Lantern Conversion Kits

Figure 1:
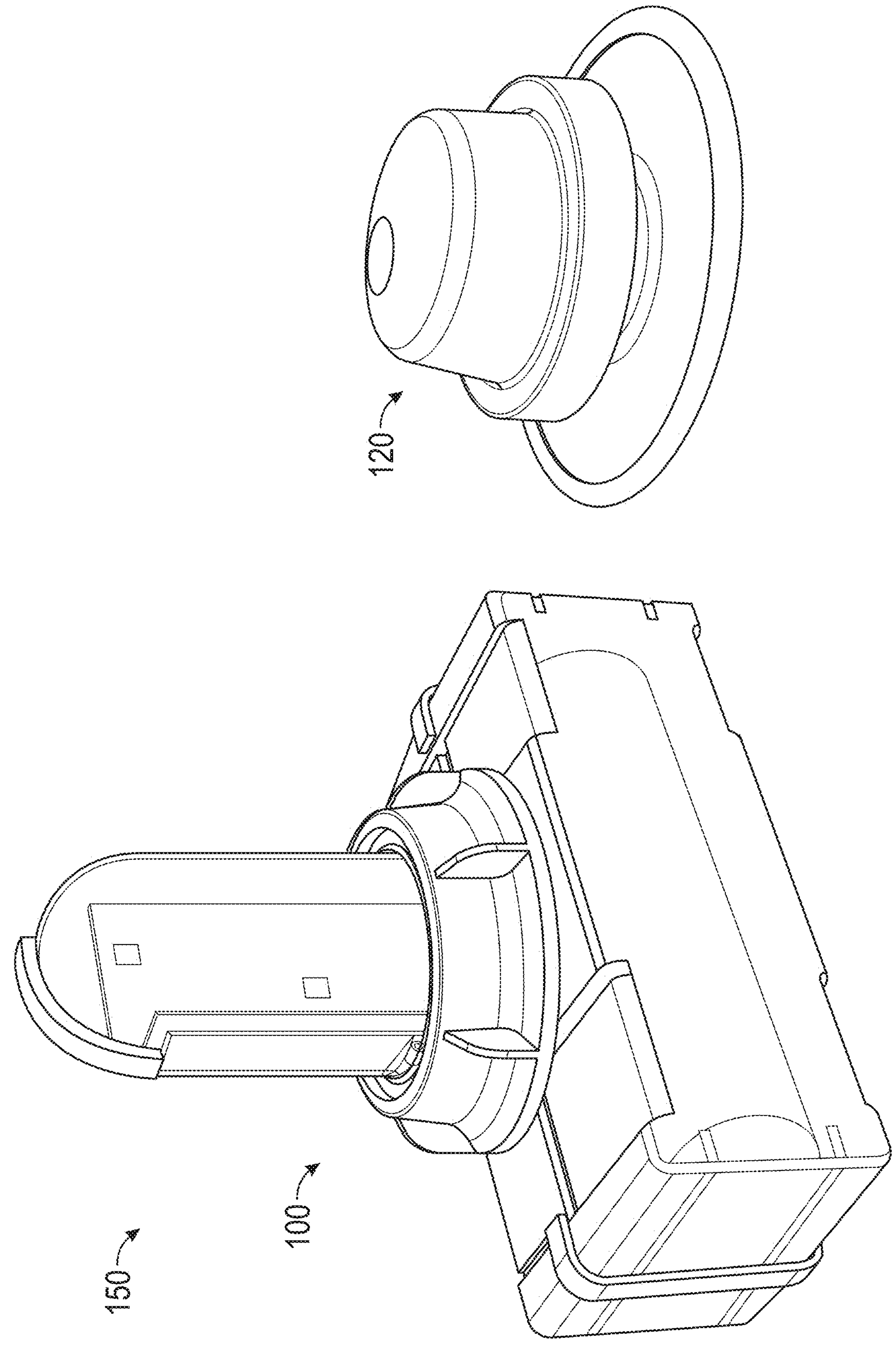
FIG. 1 illustrates a light unit and a switch unit of a kerosene lantern conversion kit, in accordance with some embodiments.
Figure 2A:
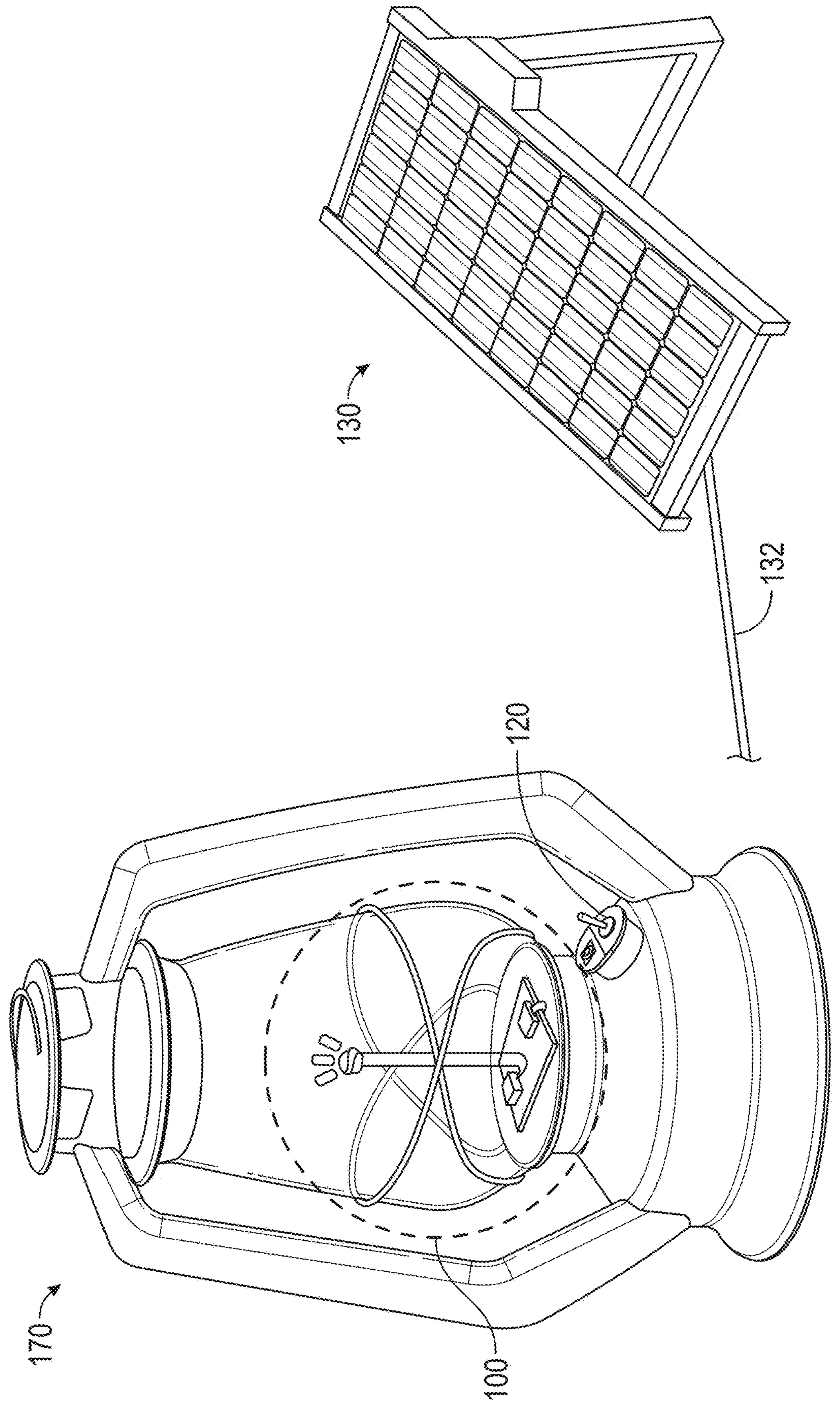
FIG. 2A illustrates a solar light kit converted from a kerosene lantern with the solar panel placed adjacent to the lantern, in accordance with some embodiments.
Figure 2B:
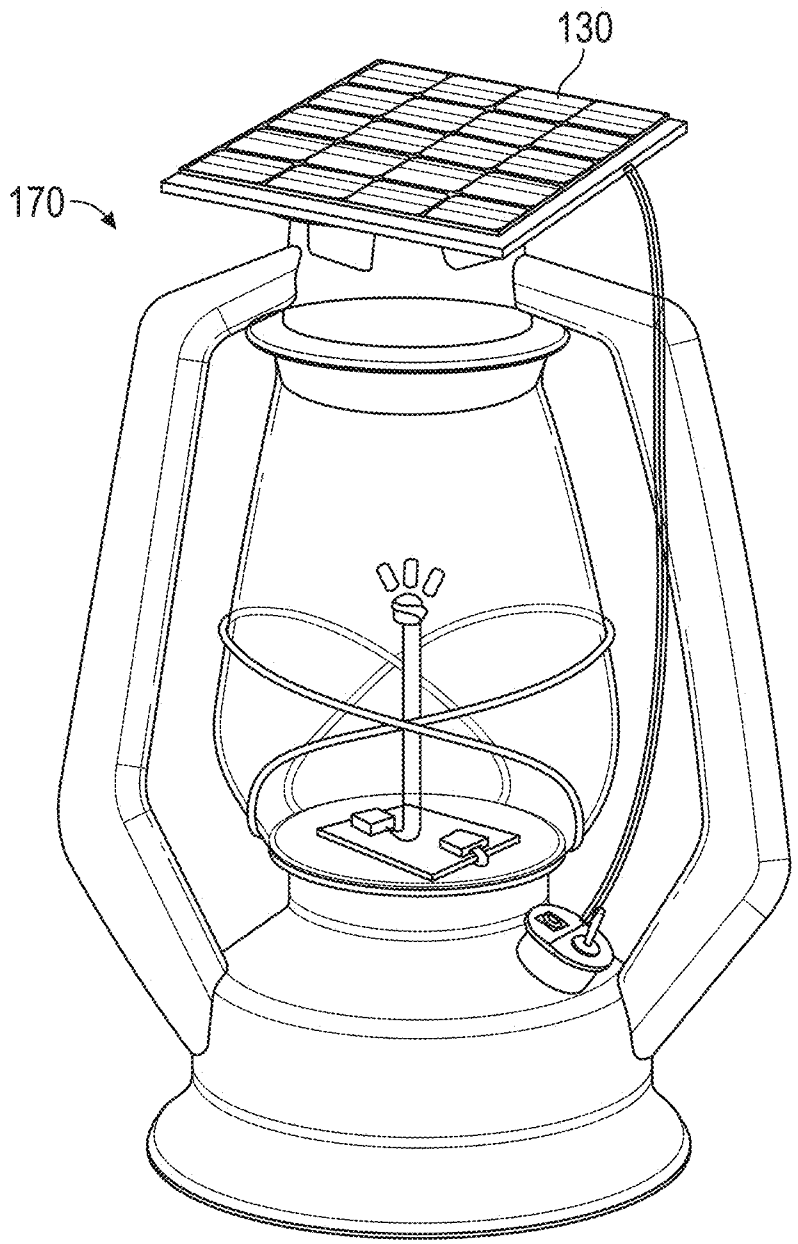
FIG. 2B illustrates a solar light kit converted from a kerosene lantern with the solar panel attached to the lantern, in accordance with some embodiments.

In some embodiments, a kit for converting a kerosene lantern to a solar light device may comprise a light unit, a switch unit, and a solar panel. FIG. 1 illustrates a light unit 100 and a switch unit 120 of a kerosene lantern conversion kit 150. FIGS. 2A-2B illustrate a converted kerosene lantern 170 comprising the light unit 100, switch unit 120, and a solar panel 130. As will be described in greater detail herein with respect to the method illustrated in FIGS. 5A-5D, the light unit 100 may be configured to be inserted into the kerosene lantern, and the switch unit 120 may be configured to be inserted into a kerosene-filling opening of the kerosene lantern. The solar panel 130 may be configured to electrically couple to the light unit 100 (e.g., a battery and/or light source of the light unit 100) to deliver energy generated by the solar panel 130 to the battery and/or light source of the light unit 100.

Light Unit

As illustrated in FIGS. 3A-3D, the light unit 100 may comprise a light source 102 and a battery 104 electrically coupled to the light source 102.

The light source 102 may comprise one or more light emitting diodes (LEDs), light bulbs, etc. For example, the light source 102 may comprise 1, 2, 3, 4, 5, 6, 7, 8 or more light sources. The one or more light sources may be configured to emit light in one or more colors, such as white, yellow, red, green, blue, etc. In some embodiments, the light source 102 may be configured to emit light of different intensities (e.g., different levels of brightness, such as low, medium, and high brightness). In some embodiments, the light source 102 may be configured to emit light in accordance with a pattern (i.e., a flickering or flashing pattern).

The battery 104 may comprise a rechargeable battery, such as one or more lithium-ion batteries. The battery 104 may comprise a lithium, alkaline, or nickel metal hydride (NiMH) battery. The battery 104 may comprise a plurality of batteries electrically coupled to the light source 102.

In some embodiments, the light unit 100 may comprise a circuit board 106, such as a printed circuit board (PCB). One or more of the light source 102 and the battery 104 may be mounted on the circuit board 106. In some embodiments, one or more of the light source 102 and the battery 104 may be electrically coupled to (e.g., not physically mounted on) the circuit board 106. For example, as illustrated in FIGS. 3A-3D, the light source 102 may be mounted on the circuit board 106, whereas the battery 104 may be electrically coupled to the circuit board 106. One or more of the light source 102 and the battery 104 may be removably attachable to the circuit board 106.

Figure 3B:
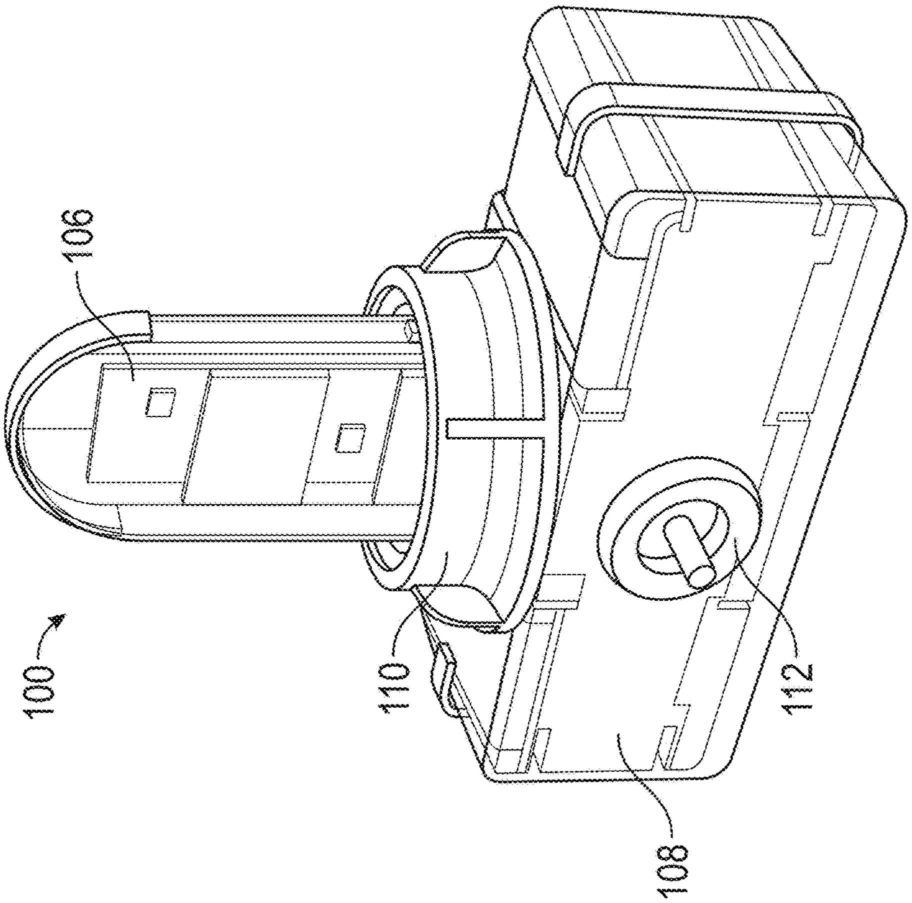
FIG. 3B illustrates a perspective view of the light unit of the kerosene lantern conversion kit, in accordance with some embodiments.
Figure 3A:
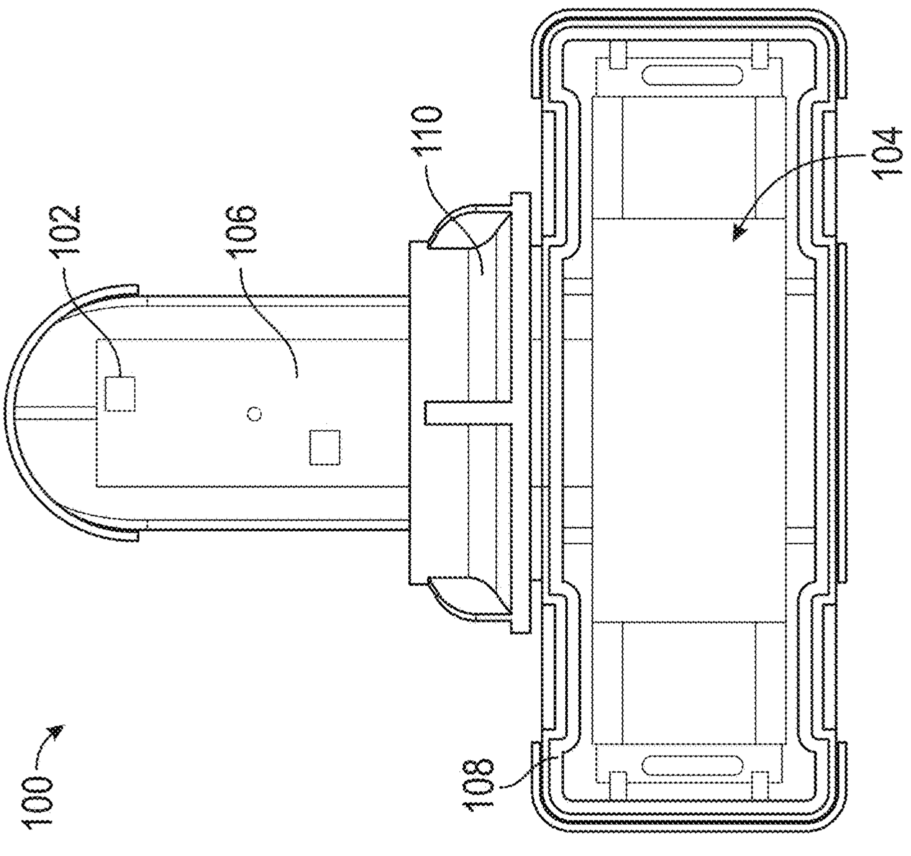
FIG. 3A illustrates a front view of a light unit of the kerosene lantern conversion kit, in accordance with some embodiments.
Figure 3C:
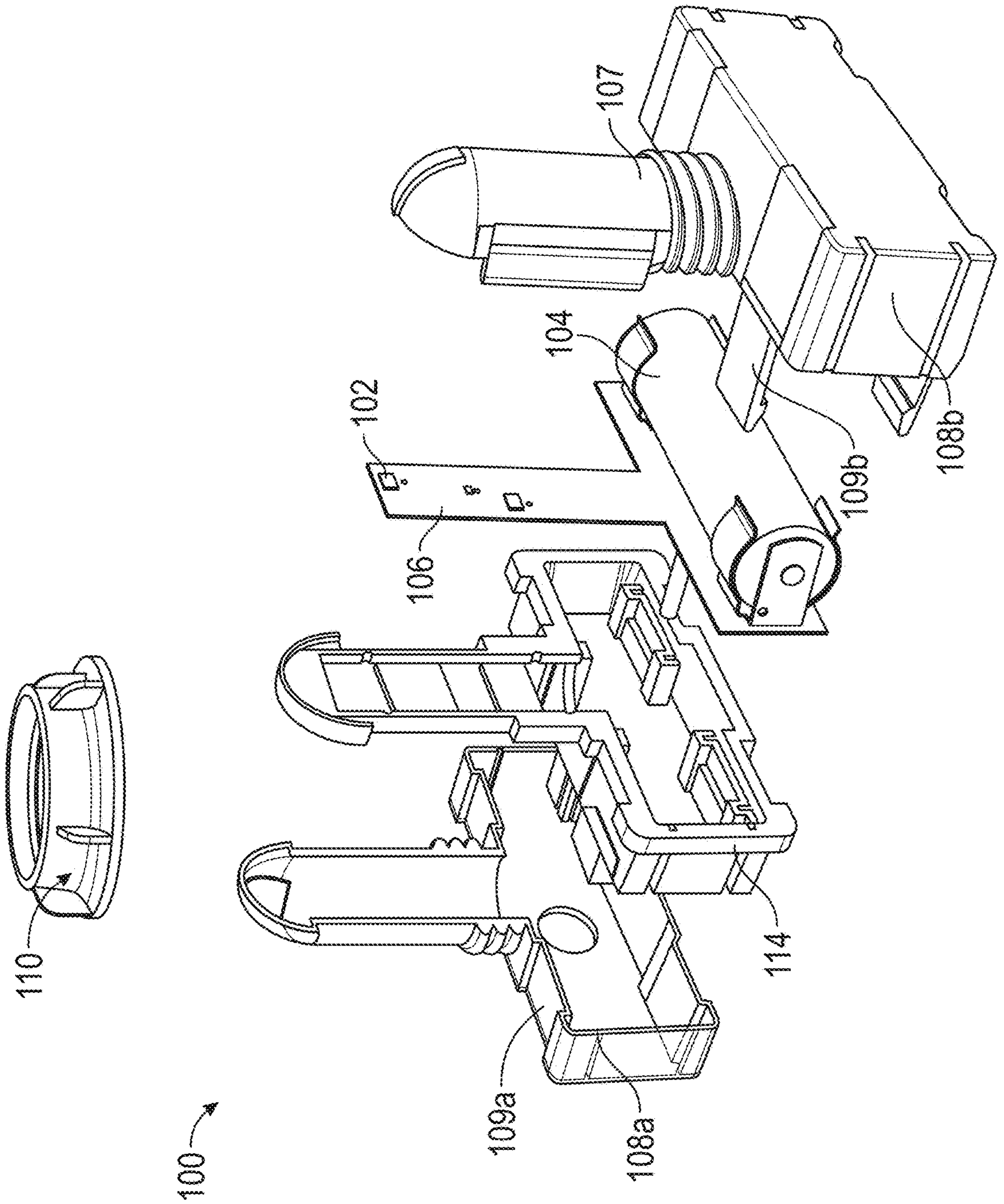
FIG. 3C illustrates an exploded view of the light unit of the kerosene lantern conversion kit, in accordance with some embodiments.
Figure 3D:
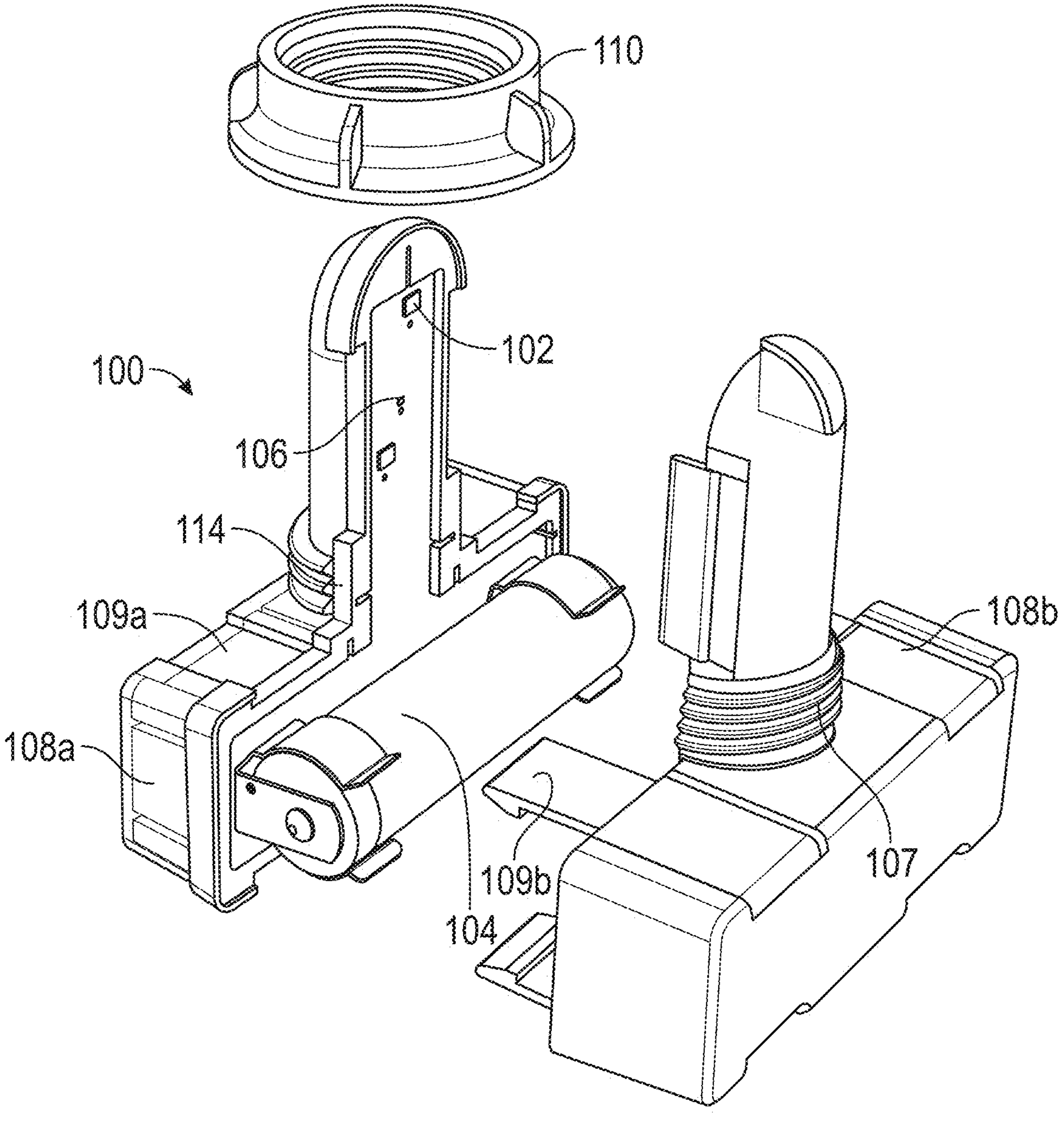
FIG. 3D illustrates a perspective view of the light unit of the kerosene lantern conversion kit in a detached state, in accordance with some embodiments.

The circuit board 106 may be configured such that it mimics the shape of the wick of the traditional kerosene lantern. In a traditional kerosene lantern, the wick extends from a base of the kerosene lantern into a translucent light-emitting portion of the lantern. Thus, the circuit board 106 (and more generally, the light unit 100) may comprise a base portion configured to be inserted to the base of the lantern, and a light-emitting portion configured to extend into the light-emitting portion of the lantern. FIGS. 2A-2B illustrate a converted kerosene lantern 170 that demonstrates the light-emitting portion of the light unit 100 extending into the translucent light-emitting portion of the lantern. FIGS. 3C-3D illustrate a T-shaped circuit board 106 comprising a light-emitting portion on which the light source 102 may be mounted (or electrically coupled to), and a base portion on which the battery 104 may be mounted (or electrically coupled to).

It is to be understood that the circuit board 106 may comprise one or a plurality of circuit boards electrically coupled to one another. For example, the light unit 100 may comprise a light source 102 mounted or electrically coupled to a first circuit board 106, and a battery 104 mounted or electrically coupled to a second circuit board 106. Moreover, it is to be understood that the light unit 100 described herein may not comprise a circuit board 106. Rather, the light source 102 and battery 104 may be electrically coupled and optionally attached, for example, via one or more wires.

The light unit 100 may comprise a light housing 108 configured to enclose the light source 102 and the battery 104. In the instance the light source 102 and battery 104 are electrically coupled to or mounted on a circuit board 106, the light housing 108 may be configured to enclose the circuit board 106. The light housing 108 may comprise a sleek profile configured to mimic that of the circuit board 106, the battery 104, and/or the light source 102. The profile of the light housing 108 may enable the light housing 108 to be easily inserted to existing receptacles and openings in the kerosene lantern. For example, as shown in FIGS. 1 and 3A-3B, the light housing 108 may comprise a T-shaped body. As described with respect to the circuit board 106 (and more generally, the light unit 100) the base portion of the light housing 108 may be configured to be housed in the base portion of the kerosene lantern, and the light-emitting portion of the housing 108 extending from the base portion may be configured to extend into the light-emitting portion of the kerosene lantern. In this manner, the profile of the light unit 100 may mimic that of the pre-existing wick components of the kerosene lantern.

The light housing 108 may comprise a translucent or semi-translucent material. For example, the light housing 108 may comprise a textured surface configured to distribute light emitted from light source 102 enclosed within the housing 108. Example materials for the light housing 108 may include but are not limited to polycarbonate (PC), acrylic butadiene styrene (ABS), polypropylene, polyethylene terephthalate (PET), polyethylene, polystyrene, high-density polyethylene (HDPE), polyvinyl chloride (PVC), acrylic, or mixtures thereof.

The light housing 108 may comprise a first attachment body 108*a* configured to removably attach to a second attachment body 108*b* of the light housing to enclose the light source 102 and the battery 104. In some embodiments, the first attachment body 108*a* may enclose a first side of the circuit board 106, and the second attachment body 108*b* may enclose a second side of the circuit board 106. In some embodiments, the first attachment body 108*a* may enclose the light source 102 of the light unit, whereas the second attachment body 108*b* may enclose the battery 104. In some embodiments, the first or second attachment body 108*a*, 108*b* may be a hollow shell configured to enclose substantially all of the internal components (e.g., light source 102, battery 104, circuit board 106), and the other of the first or second attachment body 108*a*, 108*b* may be a cap that, when properly attached to the shell, can fully enclose the components into the body.

In some embodiments, the first attachment body 108*a* may be configured to removably attach to the second attachment body 108*b* without using additional attachment components, such as screws, nuts, bolts, etc. For example, the first attachment body 108*a* and the second attachment body 108*b* may be configured to attach using a press-fit, snap-fit, a threaded connection, etc. As shown in FIGS. 3C-3D, the first attachment body 108*a* and the second attachment body 108*b* may comprise attachment portions 109*a*, 109*b* configured to connect the attachment bodies 108*a*, 108*b*. For example, the attachment portions may comprise one or more clips, arms, snaps, etc. extending from one of the attachment bodies (e.g., attachment portion 109*b* on attachment body 108*b*) and configured to be received by one or more corresponding slots, receptacles, engravings, etc. on the other attachment body (e.g., attachment portion 109*a* on attachment body 108*a*). In this manner, the first attachment body 108*a* and second attachment body 108*b* may be configured to removably attach to securely enclose the light source 102 and battery 104 within the housing 108.

In some embodiments, the light unit 100 may comprise a sealing body 114. The sealing body 114 may be configured to be disposed between the attachment bodies 108*a*, 108*b* to further secure the connection between the two bodies. In some embodiments, the sealing body 114 may comprise an external edge for sealing the connection between the two bodies, but may further comprise an internal shell configured to surround at least a portion of the battery 104 and/or the light source 102 (e.g., mounted on and/or electrically coupled to a circuit board 106). For example, as shown in FIG. 3C, the sealing body 114 may be molded such that the circuit board 106 (and the battery 104) can be at least partially inserted to the sealing body 114. The shape of the internal portion of the sealing body 114 may be such that it can be inserted to at least one of the first attachment body 108*a* or second attachment body 108*b*, as shown. The sealing body 114 may comprise a silicon or other flexible polymer material. In this manner, the sealing body 114 may cushion the electronic components enclosed within the housing 108, which, as described herein, may comprise a non-flexible polymer.

The light unit 100 may comprise a collar 110 configured to removably attach the light housing 108 to a wick holder within the kerosene lantern. For example, as shown in FIG. 1 and FIGS. 3A-3B, the collar 110 may be configured to be inserted over a light-emitting portion of the light housing 108. The collar 110 and the light housing 108 may be configured to removably attach via a threaded mechanism, snap-fit, press-fit, etc. For example, as shown in FIGS. 3C-3D, the light housing 108 (e.g., the first attachment body 108*a* and the second attachment body 108*b* of the light housing 108) may comprise a threaded portion 107 configured to attach to the collar 110. In assembling the light unit 100 within the kerosene lantern, the light-emitting portion of the light unit 100 may be configured to be inserted into the light-emitting portion of the lantern. The light-emitting portion of the lantern may comprise existing wick components, such as a wick holder. The wick holder may comprise a stand fixture including an annular ring. Thus, the light-emitting portion of the light housing 108 may be configured such that it can be inserted into the annular portion of the wick holder, and the collar 110 may be advanced onto the light housing 108 until it reaches the annular ring. The collar 110 may be threaded onto the threaded portion 107 of the light housing 108, thereby capturing the annular ring of the wick holder and removably securing the light housing 108 to the lantern.

As shown in FIG. 3B, the light unit 100 (e.g., the light housing 108 of light unit 100) may comprise one or more openings 112 configured to facilitate an electrical connection between electrical components enclosed within the housing 108 (e.g., light source 102, battery 104) and electrical components external to the housing 108 (e.g., electrical components of switch unit 120, solar panel 130). In some embodiments, a portion of sealing body 114 may be configured to be inserted to the opening 112 to seal the opening 112 around a wire/cable connector. The one or more openings 112 may be disposed on a side of the housing 108, a bottom face of the housing 108, etc.

Switch Unit

Figure 4:
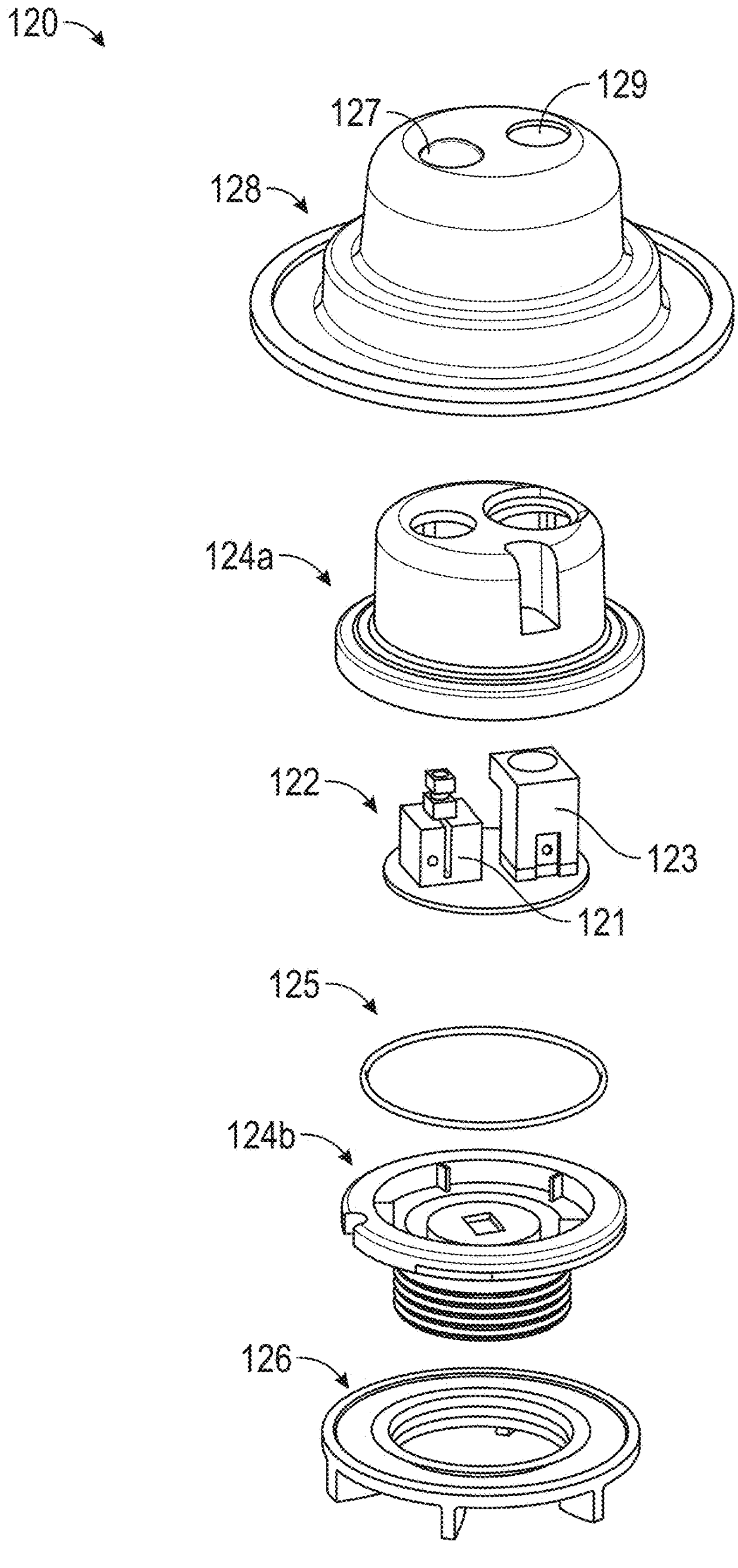
FIG. 4 illustrates an exploded view of a switch unit of the kerosene lantern conversion kit, in accordance with some embodiments.

As described herein, the kerosene lantern conversion kit may comprise a switch unit 120, illustrated at least in FIGS. 1 and 4. The switch unit 120 may comprise a switch configured to electrically couple to the light source 102 to control the light source 102.

FIG. 4 illustrates an exploded view of the switch unit 120 comprising a switch 121. The switch 121 may be mounted on a circuit board 122. The switch 121 may comprise a toggleable slide or button switch that can be switched between two or more settings (e.g., an on setting and an off setting). As described herein, in some embodiments, the light source 102 may be configured to emit light in different colors, different light intensities, different lighting patterns, etc. In these instances, the switch 121 may have a plurality of settings for each setting of the light. In some embodiments, the switch unit 120 may comprise more than one switch 121. For example, the switch unit 120 may comprise a first switch 121 configured to power the light source 102 on and off, and a second switch configured to toggle the settings of the light source 102.

The switch unit 120 may comprise an electrical port 123 configured to facilitate connection between the battery and the solar panel to deliver the energy generated by the solar panel to the battery. The electrical port 123 may be electrically coupled to the battery 104 and/or light source 102 (e.g., to the circuit board 106). The electrical port 123 may be mounted on the circuit board 122, for example, proximate to the switch 121. The electrical port 123 may be configured to receive a cable (e.g., cable 132, described in greater detail below with reference to solar panel 130). Energy generated by the solar panel 130 may be delivered to the battery 104 when the cable 132 is inserted to the electrical port 123 and is properly connected to the solar panel 130.

The switch unit 120 may comprise a switch housing 124*a*, 124*b* (collectively referred to herein as switch housing 124) configured to enclose the switch 121 and the electrical port 123 (e.g., and the circuit board 122). The switch housing 124 may comprise one or more openings for accessing the switch 121 and the electrical port 123, as shown in FIG. 4. The switch housing 124 may comprise one or more bodies, such as first attachment body 124*a* and second attachment body 124*b*. In some embodiments, one the attachment bodies (e.g., first attachment body, as shown) may be a shell configured to enclose substantially all of switch 121 and electrical port 123 (and therefore may comprise the one or more openings for accessing the switch 121 and electrical port 123), and the other attachment body (e.g., second attachment body 124*b*) may be a cap that, when properly attached to the shell, can fully enclose the components into the body. In some embodiments, the switch unit 120 may comprise a seal 125, such as an o-ring, configured to secure the connection between the first and second attachment bodies 124*a*, 124*b* of the switch housing 124.

In some embodiments, the switch housing 124 (e.g., second attachment body 124*b* of switch housing 124) may comprise a connection portion configured to attach the switch housing 124 to the kerosene-filling opening. The connection portion of the housing 124 may be configured to connect to a collar 126 to secure the switch housing 124 within the kerosene-filling opening. For example, the collar 126 may be configured to be inserted to the kerosene-filling opening, such as via a press-fit, snap-fit, etc., and the connection portion of the switch housing 124 may be inserted to the collar 126 within the kerosene-filling opening of the lantern. The connection portion of the switch housing 124 and the collar 126 may be configured to removably attach via a threaded mechanism, a snap-fit, a press-fit, etc. The attachment between the kerosene-filling opening, the collar 126, and the switch housing 124 may not require the use of any additional attachment/fixation components, such as threads, screws, nuts, bolts, etc.

The switch unit 120 may comprise a button molding 128 configured to cover the kerosene-filling opening. The button molding 128 may comprise a button 127 configured to couple to the switch 121 to control the light source 102. For example, the button 127 of the button molding 128 may comprise an engraving in the molding 128 that can indicate to the user where to press to engage with the switch 121. The button molding 128 can comprise an opening 129 configured to facilitate the electrical connection between the electrical port 123 and the cable 132. In some embodiments, the opening 129 of the button molding 128 may comprise a removable cap configured to cover the opening when the electrical port 123 is not in use. The button molding 128 may comprise a flexible material, such as silicon. The button molding 128 may be configured to cover the kerosene-filling opening without using additional attachment components or adhesives. For example, the button molding 128 may be flexible such that it can reversibly stretch and expand to cover different sizes of kerosene-filling openings of lanterns.

The solar panel 130 may comprise one or more photovoltaic (PV), monocrystalline, and/or thin-film cells electrically connected in series and configured to generate energy to charge battery 104. The solar panel 130 may be removably attachable to the kerosene lantern and/or may stand alone from the lantern. In some embodiments, the solar panel 130 may be configured to attach to an external surface of the converted kerosene lantern 170, as shown in FIG. 2B. For example, the solar panel 130 may be configured to attach to a side, a top surface, etc. of the kerosene lantern. In some embodiments, the solar panel 130 may comprise a frame and stand configured to prop and/or hang the solar panel 130 at a desired angle for receiving solar energy, as shown in FIG. 2A.

As shown in FIGS. 2A-2B, the kerosene lantern conversion kit 150 may comprise a cable 132 configured to connect to the light unit 100 (e.g., via the switch unit 120) and the solar panel 130. For example, the cable 132 may be configured to connect to the electrical port 123 of the switch unit 120 and to the solar panel 130 to deliver the energy generated by the solar panel 130 to the battery 104 of the light unit 100.

Methods for Converting Kerosene Lanterns to Solar Light Devices

FIGS. 5A-5D illustrate a method for converting a kerosene lantern 170 to a solar light device powered by a solar light panel. As described herein, the kerosene lantern conversion kits may be provided to developing communities that may have limited resources, including tools and machining skills. The process of converting kerosene lanterns to solar light devices using the conversion kits described herein may require only basic training and a simple tool.

Figure 5B:
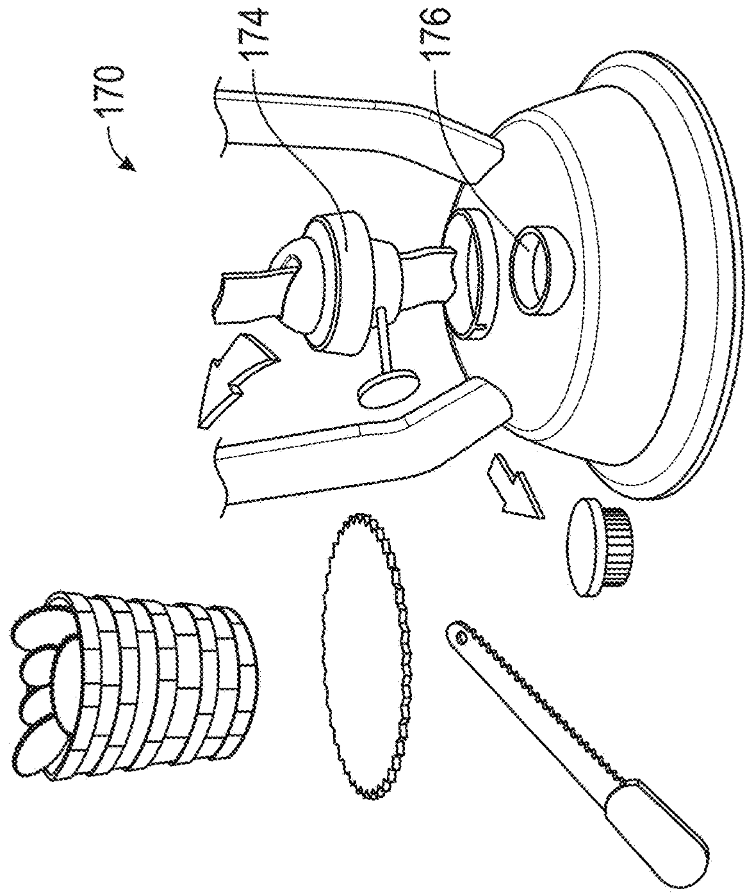
FIG. 5B illustrates a second step in converting the kerosene lantern to the solar light source, in accordance with some embodiments.
Figure 5A:
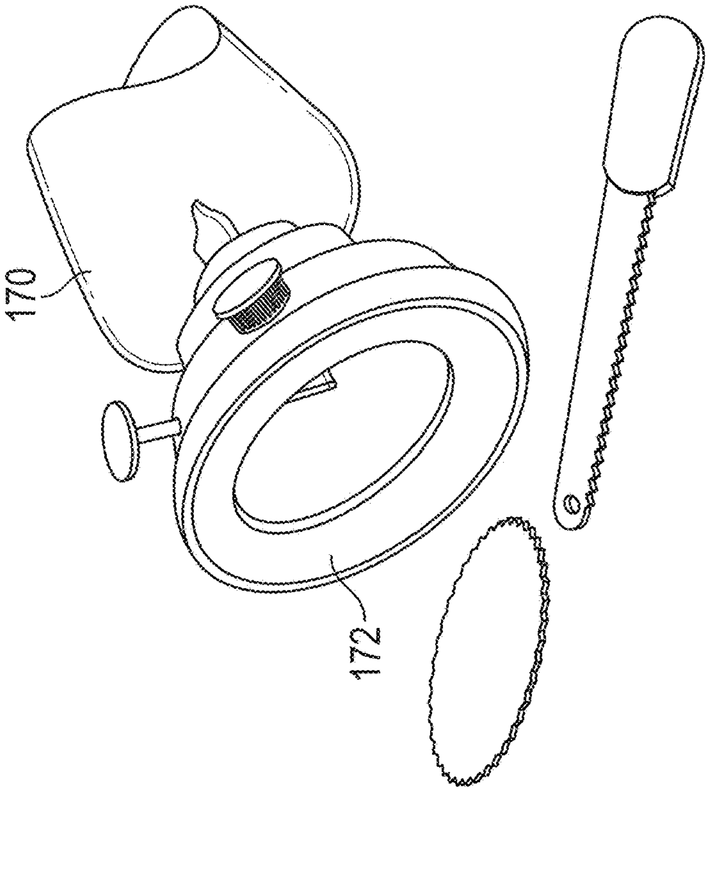
FIG. 5A illustrates a first step in converting a kerosene lantern to a solar light source, in accordance with some embodiments.

As shown in FIG. 5A, the method may include removing a portion of the kerosene lantern 170. For example, a bottom face of the base 172 of the lantern may be removed to access the internal space of the lantern. In some embodiments, the bottom face of the lantern may be removed using a tool comprising a mechanically rotating cutting wheel with a counter-rotating cutting wheel, otherwise referred to herein as a can opener or tin opener. The tools for removing the base of the lantern may be easily accessible or provided to users in remote and/or developing communities.

As shown in FIG. 5B, the method may comprise removing wick components (e.g., wick 174) from within the kerosene lantern 170. The wick 174 may be removed by hand. The wick 174 may be removably inserted to an opening in the base 172 of the lantern 170, as shown in the Figure. By removing the wick 174, a space within the lantern 170 for securing the replacement light fixture, light unit 100, can be created.

As shown in FIG. 5B, the method may further comprise removing a cap from a kerosene-filling opening 176 of the lantern 170. As described herein, the kerosene-filling opening 176 of the lantern 170 may be repurposed for housing a switch unit 120 of the kerosene lantern conversion kit.

Figure 5D:
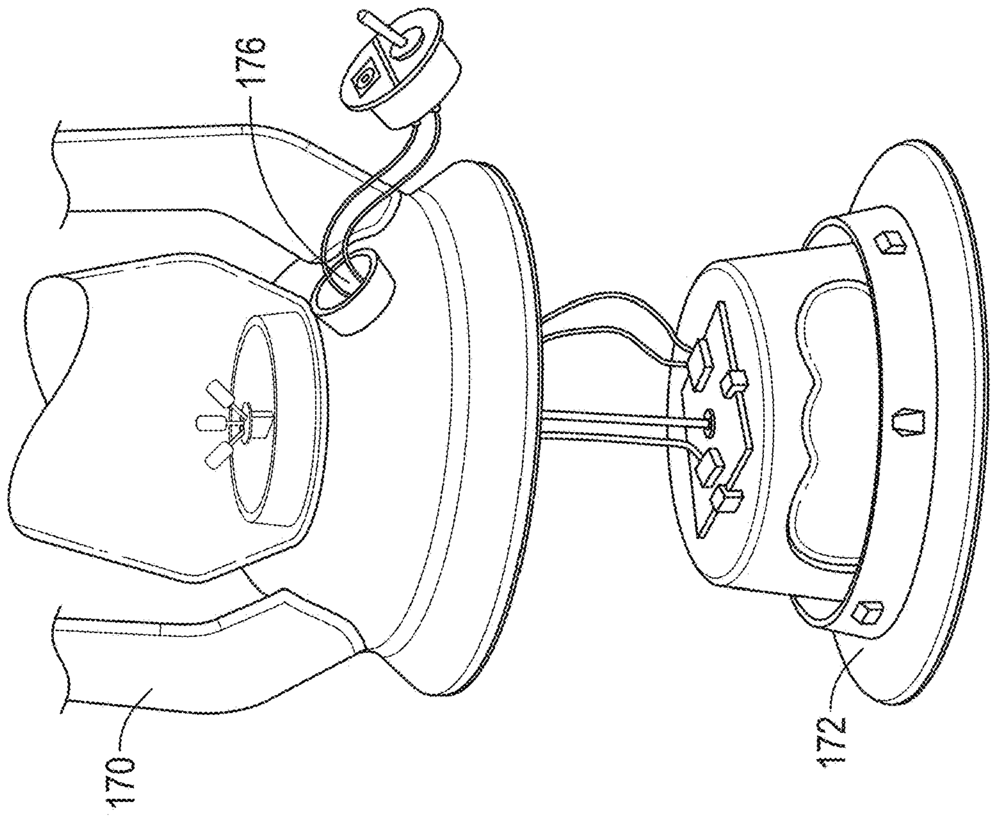
FIG. 5D illustrates a fourth step in converting the kerosene lantern to the solar light source, in accordance with some embodiments.
Figure 5C:
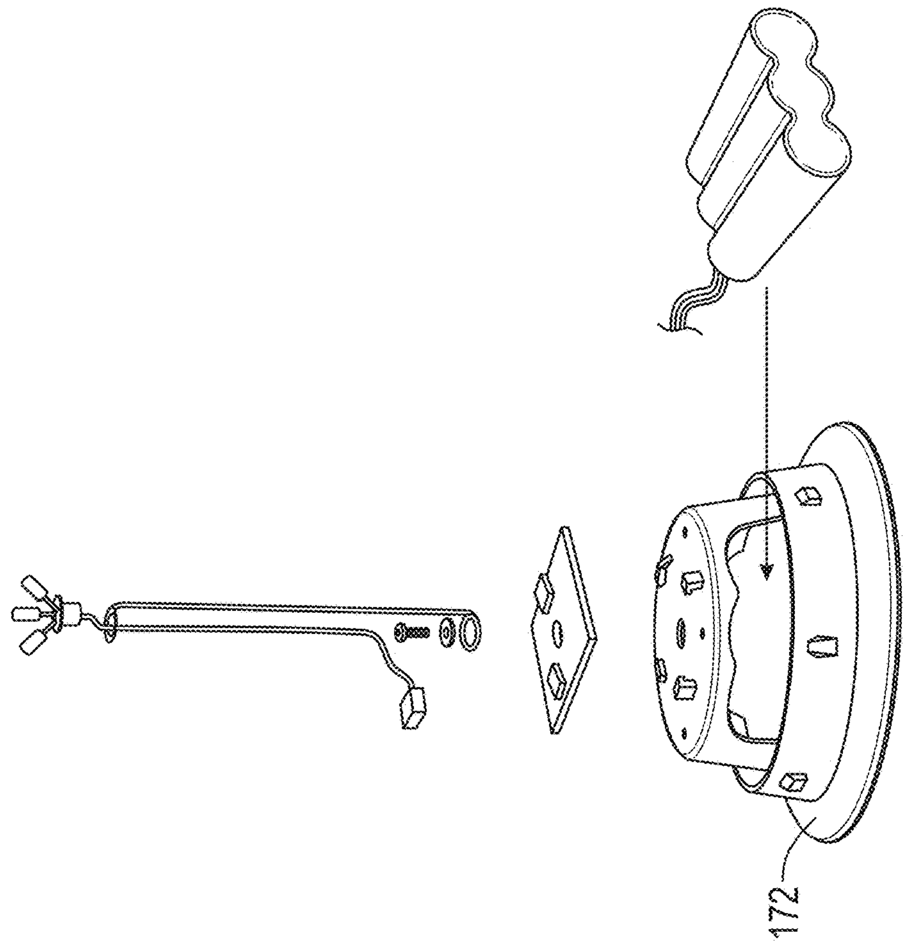
FIG. 5C illustrates a third step in converting the kerosene lantern to the solar light source, in accordance with some embodiments.

As shown in FIG. 5C, the method may include inserting a light unit (e.g., light unit 100) into the kerosene lantern 170. For example, one or more components of the light unit 100 (e.g., the base portion of the light housing 108 of light unit 100, which may enclose the battery 104) may be inserted to the base 172 of the lantern 170. As described herein, a light-emitting portion of the light housing 108 may extend from the base portion of the housing 108, out of the base 172 of the lantern. Alternatively, as illustrated in FIG. 5C, the light unit 100 may not comprise a housing that encloses the lighting components, and one or more of the components (e.g., battery 104) may be disposed within the hollow base 172. One or more of the lighting components (e.g., a circuit board 106) may be attached to an external surface of the base 172 such that a light source 102 mounted on the circuit board 106 can extend from the base 172 and into a light-emitting portion of the lantern 170, as described herein with respect to FIG. 5D.

In some embodiments, inserting the light unit into the kerosene lantern 170 may comprise inserting a light-emitting portion of the light unit through a wick holder of the kerosene lantern 170. The wick holder may comprise an annular ring typically configured to support the wick in the kerosene lantern. In some embodiments, the wick holder may comprise the opening in the base 172 of the lantern 170 described herein with respect to FIG. 5B. The light-emitting portion of the light unit may be inserted from the base 172 into and through the wick holder. The light unit (e.g., the housing 108 of the light unit 100) may be configured to removably attach to the lantern 170, such as to the wick holder of the base 172 of the lantern 170, using a first collar (e.g., collar 110). As described herein, the collar may be inserted over the light-emitting portion of the light unit and the wick holder and secured to the light unit (e.g., via a threaded mechanism, press-fit, snap-fit, etc.).

In some embodiments, the method for converting the kerosene lantern to a solar light device may comprise electrically connecting the light unit and the switch unit of the conversion kit. For example, the units may be electrically connected prior to inserting the switch unit into the kerosene-filling opening, and thus the user may utilize the opening to electrically connect the components. The components may be connected by one or more electrical wires. Electrically connecting the light unit and the switch unit may comprise at least electrically connecting the switch (e.g., switch 121) and the light source (e.g., light source 102). In some embodiments, electrically connecting the light unit and the switch unit may comprise electrically connecting a battery of the light unit (e.g., battery 104) and an electrical port of the switch unit (e.g., electrical port 123). In some embodiments, the battery and the light source may be mounted on and/or electrically coupled to a circuit board (e.g., circuit board 106). Likewise, the electrical port and the switch may be mounted on a circuit board (e.g., circuit board 122). The circuit boards of the light unit 100 and the switch unit 120 may be configured to electrically connect via one or more electrical wires.

As shown in FIG. 5D, the method may include inserting a switch unit (e.g., switch unit 120) into the kerosene-filling opening 176 of the kerosene lantern 170. Inserting the switch unit into the opening 176 may comprise securing a housing of the switch unit within the kerosene-filling opening 176 using a second collar (e.g., collar 126). For example, the collar may be inserted to and removably secured within the kerosene-filling opening 176 (e.g., via a press-fit, snap-fit, threaded mechanism, etc.). The collar may be configured to receive and removably connect to the switch unit (e.g., switch housing 124 of switch unit 120). For example, the collar and the housing may be configured to removably attach via a press-fit, snap-fit, threaded mechanism, etc.

In the instance the switch unit comprises a button molding (e.g., button molding 128 of switch unit 120), the method may comprise covering the kerosene-filling opening with the button molding. In some embodiments, the button molding may comprise a flexible material configured to reversibly expand to cover the opening without the use of any additional adhesives, attachment mechanisms, etc.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A kit for converting a kerosene lantern to a solar light device comprising: a light unit configured to be inserted into the kerosene lantern, comprising: a light source; and a battery electrically coupled to the light source; a switch unit configured to be inserted into a kerosene-filling opening of the kerosene lantern, comprising: a switch configured to electrically couple to the light source to control the light source; an electrical port configured to electrically couple to the battery; a switch housing configured to enclose the switch and the electrical port; and a collar configured to secure the switch housing within the kerosene-filling opening; and a solar panel configured to electrically couple to the battery via the electrical port to deliver energy generated by the solar panel to the battery.

2. The kit of claim 1, wherein the light unit comprises a light housing configured to enclose the light source and the battery.

3. The kit of claim 2, wherein the light unit comprises a collar configured to removably attach the light housing to a wick holder within the kerosene lantern.

4. The kit of claim 3, wherein the collar and the light housing are configured to removably attach via a threaded mechanism, snap-fit, or press-fit.

5. The kit of claim 2, wherein the light housing comprises a first attachment body configured to removably attach to a second attachment body of the light housing to enclose the light source and the battery.

6. The kit of claim 5, wherein the first attachment body is configured to removably attach to the second attachment body without using additional attachment components.

7. The kit of claim 1, comprising a cable configured to connect to the electrical port and to the solar panel to deliver the energy generated by the solar panel to the battery.

8. The kit of claim 1, wherein the light unit comprises a circuit board, and the light source is mounted to the circuit board and the battery is electrically coupled to the circuit board.

9. The kit of claim 1, wherein the solar panel is configured to attach to an external surface of the kerosene lantern.

10. The kit of claim 1, wherein the light unit is configured to be inserted to a base of the kerosene lantern such that a light-emitting portion of the light unit extends through a wick holder of the kerosene lantern and into a light-emitting portion of the kerosene lantern.

11. The kit of claim 1, wherein the switch unit comprises a button molding configured to cover the kerosene-filling opening and comprising a button configured to couple to the switch to control the light source.

12. The kit of claim 1, wherein the switch unit comprises one or more openings for accessing the switch and the electrical port.

13. The kit of claim 1, wherein the collar and the switch housing are configured to removably attach via a threaded mechanism, snap-fit, or press-fit.

14. A method for converting a kerosene lantern to a solar light device comprising: removing a bottom face of the kerosene lantern; inserting a light unit into the kerosene lantern, the light unit comprising a light source and a battery electrically coupled to the light source, the battery configured to receive energy generated by a solar panel; inserting a switch unit into a kerosene-filling opening of the kerosene lantern, the switch unit comprising; a switch configured to control the light source; an electrical port configured to electrically couple the battery to the solar panel; and a switch housing configured to enclose the switch and the electrical port; securing the switch unit within the kerosene-filling opening using a collar; and electrically connecting the switch and the light source.

15. The method of claim 14, comprising, after securing the switch unit within the kerosene-filling opening, covering the kerosene-filling opening using a button molding.

16. The method of claim 15, wherein the button molding comprises a button that couples to the switch for controlling the light source.

17. The method of claim 14, comprising removing a wick mechanism from within the kerosene lantern by hand.

18. The method of claim 14, comprising attaching the light unit to a wick holder within the kerosene lantern using a second collar.

19. The method of claim 14, wherein a can opener is used to remove the bottom face of the kerosene lantern.

20. The method of claim 14, wherein the switch unit comprises one or more openings for accessing the switch and the electrical port.

* * * * *